W. A. MOORE.
NUT LOCK.
APPLICATION FILED MAY 4, 1911.
1,032,929.
Patented July 16, 1912.
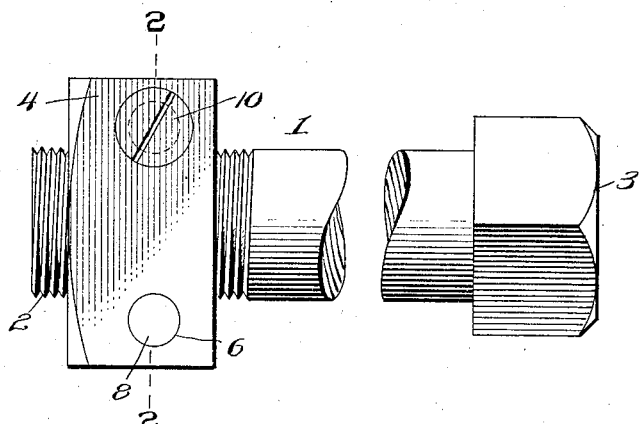
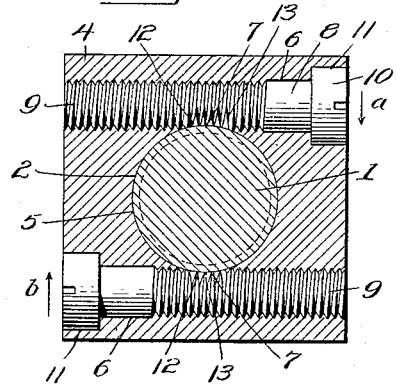
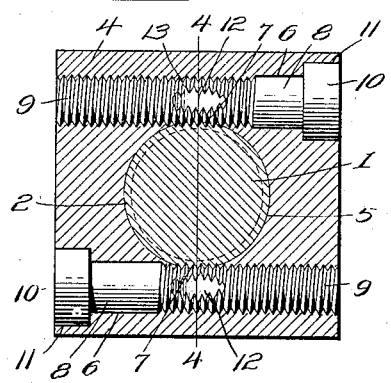
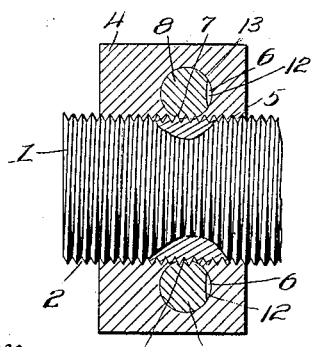
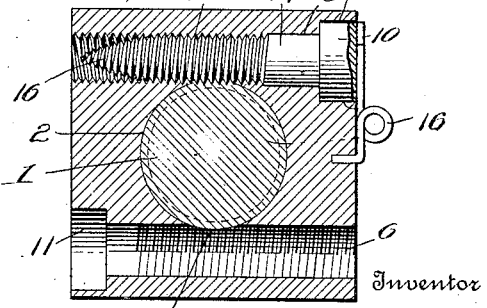
Witnesses
F. C. Gibson
Inventor
William A. Moore.
By Victor J. Evans
Attorney

UNITED STATES PATENT OFFICE.

WILLIAM A. MOORE, OF GAITHERSBURG, MARYLAND.

NUT-LOCK.

1,032,929.  Specification of Letters Patent.  Patented July 16, 1912.

Application filed May 4, 1911. Serial No. 624,964.

*To all whom it may concern.*

Be it known that I, WILLIAM A. MOORE, a citizen of the United States, residing at Gaithersburg, in the county of Montgomery and State of Maryland, have invented new and useful Improvements in Nut-Locks, of which the following is a specification.

This invention relates to nut locks, and has for an object to provide a device of this character which will obviate the necessity of change in the construction of the bolt and which will include means, whereby the nut can be readily applied to the bolt and positively held thereon against retrograde movement after its desired adjustment has been obtained.

Another object of the invention is to provide a group of fastening devices which are adjustable in the nut tangential to the plane of the bolt opening, the said devices operating in opposition to each other so as to positively prevent their casual disengagement from the bolt.

Another object of the invention is to provide simple and efficient locking means which may be quickly applied to or removed from the nut.

In the drawing, forming a portion of this specification and in which like numerals of reference indicate similar parts in the several views:—Figure 1 is a side view of a bolt and nut showing my improved locking device applied thereto. Fig. 2 is a section taken on line 2—2 of Fig. 1 showing the locking devices in their disengaged positions. Fig. 3 is a similar view showing the locking devices in their engaged positions. Fig. 4 is a section on line 4—4 of Fig. 3. Fig. 5 is a view similar to Fig. 3 showing a slightly modified form of the invention.

The bolt 1 shown herein is of usual construction, being provided with the usual threaded shank portion 2 and a head 3. The nut 4 is provided with a passage 5 which is threaded so as to adjustably receive the shank of the bolt. The nut has formed therein preferably two threaded passages 6 which are disposed tangential with respect to the bolt-receiving opening 5 of the nut, the inner walls of said passages being provided with openings 7 which are in direct communication with the bolt opening 5 of the nut. Fitted in each passage 6 is a locking device 8 which includes a threaded shank 9 having a head 10 at one end seated in the countersunk or enlarged portion 11 of the passage 6.

Each locking device is identical in construction, and as shown, the shank 9 thereof is provided with a concavity 12 which may be moved so as to be disposed substantially flush with the walls of the bolt opening 5 in the nut on adjustment of the device to its released position. The threads of the fastening device which are arranged wholly within the area of the concavity 12 are provided with relatively sharp cutting edges 13. These edges are adapted to be securely moved into effective biting engagement with the threads of the bolt shank, as shown in Fig. 3. When the locking device is adjusted so that its threads are in effective engagement with the bolt it will be understood that a portion of the shank of the device will be disposed in the bolt opening 5. The form of the device shown and described herein is such as will permit the nut to be readily applied to the bolt and securely held thereon against retrograde movement after it has been moved to its full adjusted position.

In 'the form of the invention shown in Fig. 5, the bolt 14 is constructed of hard steel and provided with a threaded shank 15, the forward end of which being tapered to a relatively sharp point 16, as shown.

I claim:

The combination with a threaded bolt, of a nut adjustably mounted thereon, said nut being provided with threaded passages arranged tangentially with respect to the bolt receiving opening of the nut, the inner walls of the said passages being provided with openings which are in direct communication with the said bolt opening, oppositely extending screw threaded fastening devices wholly carried by the nut and arranged within the said threaded passages and adapted to be turned so that the threads thereof will be moved into effective gripping engagement with the threads of the bolt, and each of the said fastening devices being provided with a cavity intermediate its ends whereby the said devices may be turned to a released position to permit adjustments of the nut on the bolt.

In testimony whereof I affix my signature in presence of two witnesses.

WILLIAM A. MOORE.

Witnesses:
 JOHN J. BATTLEWAY,
 G. R. GRAY.